United States Patent
Dain (10) Patent No.: US 8,647,704 B2
(45) Date of Patent: Feb. 11, 2014

(54) METHOD FOR THE TRANSLATION OF A WHITE LIGHT COLOR PALETTE TO A BLACK LIGHT COLOR PALETTE

(75) Inventor: Susan Dain, Montrose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 12/830,987

(22) Filed: Jul. 6, 2010

(65) Prior Publication Data

US 2012/0009395 A1    Jan. 12, 2012

(51) Int. Cl.
    *C23C 16/52*    (2006.01)
(52) U.S. Cl.
    USPC ................................................. 427/8; 427/157
(58) Field of Classification Search
    USPC ....................................................... 427/8, 157
    See application file for complete search history.

(56) References Cited

U.S. PATENT DOCUMENTS

| | | | |
|---|---|---|---|
| 5,236,621 A | 8/1993 | DiPietro | |
| 5,571,624 A | 11/1996 | Phillips et al. | |
| 5,863,459 A | 1/1999 | Merchak et al. | |
| 5,904,878 A | 5/1999 | Merchak et al. | |
| 6,103,006 A | 8/2000 | DiPietro | |
| 6,572,784 B1 | 6/2003 | Coombs et al. | |
| 6,997,982 B2 | 2/2006 | Pfaff et al. | |
| 7,180,524 B1* | 2/2007 | Axelrod | 345/593 |
| 2004/0139881 A1* | 7/2004 | Kaz et al. | 106/31.13 |
| 2005/0243091 A1* | 11/2005 | Hong | 345/473 |
| 2006/0063036 A1* | 3/2006 | Iwanaga | 428/690 |
| 2008/0259400 A1* | 10/2008 | Hersch et al. | 358/2.1 |
| 2011/0216372 A1 | 9/2011 | Adams | |

* cited by examiner

*Primary Examiner* — Michael Cleveland
*Assistant Examiner* — Xiao Zhao
(74) *Attorney, Agent, or Firm* — Dorsey & Whitney LLP (57) ABSTRACT

One particular implementation of the present invention may involve a method for creating a color sample that provides a first color under white light and a second color under UV or black light. In general, the first color and second color may each include a perceived hue and value (shade and tint). However, the second color may also include a luminous effect under the UV light. In some implementations, the hue and value of the first color and the second color may be the same such that the difference between the first color and the second color is a luminous effect of the color sample under the black light. In another implementation, the hue and value of the first color and the second color may differ, such that the color scheme appears as one color under white light and glows a separate color under black light.

17 Claims, 6 Drawing Sheets

METHOD FOR THE TRANSLATION OF A WHITE LIGHT COLOR PALETTE TO A BLACK LIGHT COLOR PALETTE

FIELD OF THE INVENTION

Aspects of the present invention relate to luminous paint and color and more particularly to the translation of a white light color palette to a black light color palette such that the color quality of an object appears the same or similar under two different light wavelengths, irrespective of luminance.

BACKGROUND

Amusement parks and other entertainment venues often include colorful displays to entertain and attract the patrons of the venues. For example, a colorful mural may enhance the look and feel of an amusement park ride, while a movie house may include several posters or advertisements hung on the wall of the lobby to announce the arrival of an upcoming feature. Such displays often include bright colors to attract the eye of the patrons. An additional technique often employed to attract the eye of a patron is the use of a luminous paint within the display to give off the effect of the display emitting light or glowing.

One common type of luminous effect of a mural or object involves the use of a fluorescent paint or color displayed under ultraviolet (UV) light, commonly known as black light. To provide a luminous effect, black light paint or ink may include tiny particulates included in the paint or ink that absorb the black light and re-emit visible light in response, providing a glowing effect to the black light paint. The particular color that the black light paint provides depends on the type of particulates that are mixed in with the paint. Thus, red-pigmented particulates give off a visible red light when seen under a black light. The glowing or luminous effect of black light paint provide an attraction and effect to a display that is not present by utilizing typical paints alone.

In many cases, however, black light paint often appears dull or "washed out" when viewed under white light as the particulates that provide the luminous effect to black light paint tend to obstruct or dull the brightness of the underlying color. Further, the combination black light paint and white light paint may alter the appearance of a painted object. Historically, this is typically not an issue because many displays are only viewed under the accurate conditions for the paint utilized, i.e. black light displays are typically only viewed by patrons under black light and white light displays are only viewed under white light. However, as the design of décor in entertainment venues advances, there may be instances where a particular portion of the display is viewed under both black light conditions and white light conditions. For example, a mural on a wall of an amusement park ride may include a portion that is viewed by the patrons as they transition from a white light environment to a black light environment. In this situation, some portions of the mural may be viewed by the patrons under both types of light. In another example, the ride car of an amusement park ride may transition from black light environments to white light environments several times throughout a ride. However, under white light the mural or ride car may appear dulled while under black light the mural may not glow as brilliantly as in true black light environments.

Further, the creation of an amusement park attraction may be costly and require several iterations of custom mixing of paint to achieve the desired look and feel of the attraction. For example, the application of paint to park attractions located remotely around the world often requires applicators attempt to mimic the look and feel of the attraction created by a design artist located many miles away. This may include mixing paint and other color schemes to try and match those created and selected by the design artist. However, such a process is often difficult and potentially requires several iterations of paint mixing and approval by the design artist, increasing the cost associated with the construction of the attraction. Further, such a process does not often lead to uniformity from park to park, but rather is dependent on the eye of the applicator, which can vary from person to person. Thus, what is needed is a color scheme that appears as a first known color under one light wavelength and a second known color under a second light wavelength such that a display takes on a desired color in multi-wavelength environments.

SUMMARY

One implementation may comprise a method for creating a known reference between a first color sample under a first light source having a first wave length, and a second color sample under a second light source having a second wave length. The method may comprise the operations of providing a first color sample including a perceived value and hue under the first light source and providing a second color sample including a perceived value and hue under the second light source. Further, the value and hue of the first color sample under the first light source translates into a known value and hue of the second color sample under the second light source.

Another implementation may comprise a method for creating a known reference between white light colors and black light colors comprising the operations of providing a first reference including at least one color, the color providing a perceived value and hue under a white light source and a second reference including at least one color, the color providing a perceived value, hue and luminosity under a black light source. Further, the value and hue of the first reference under the white light source translates into a known value and hue of the second reference under the black light source.

Yet another implementation includes a method of printing a colored object. The method may include the operations of determining a first color sample including a perceived value and hue under a first light source having a first wave length and utilizing a reference to translate the first color sample into a second color sample, the second color sample including a perceived value, hue and luminoscity under a second light source having a second wave length. Further, the value and hue of the first color sample may be substantially similar to the value and hue of the second color sample. In addition, the method may include the operation of printing the first color sample and the second color sample onto a two-dimensional object.

Still another implementation may include a colored object having a first perceived value and hue under a first light source having a first wave length and a second perceived value, hue and luminoscity under a second light source having a second wave length created by a process. The process may include the operations of determining a first color sample including the first perceived value and hue under the first light source, utilizing a reference to translate the first color sample into a second color sample, the second color sample including the second perceived value, hue and luminoscity under the second light source, wherein the first value and hue is substantially similar to the second value and hue and printing the first color sample and the second color sample onto an object.

DETAILED DESCRIPTION

Implementations of the present invention may involve a method for creating a color sample that provides a first color under white light and a second color under UV or black light. In general, the first color may include a perceived hue and value (shade and tint) while the second color may include a perceived second hue and value. However, the second color may also include a luminous effect under the black light. In some implementations, the hue and value of the first color and the second color may be the same such that a difference between the first color and the second color is a luminous effect of the color sample under the black light. For example, the color sample may appear red under white light and a luminous red (having the same hue and tint as under white light) under a black light. In another implementation, the hue and value of the first color and the second color may differ, such that the color sample appears as one color under white light and glows a different color under black light.

In another implementation, a chart or reference guide may be created that provides guidelines in creating or selecting the color sample with the first value and hue and the second value, hue and luminosity. For example, a chart may be created that assigns a numerical value to color samples with different perceived hue and value under both a first light wavelength and a second light wavelength. Thus, a color sample with particular properties under the white light and black light may be referred to by the reference number. In another example, a reference guide may be created that associates color samples from a white light only chart with color samples that have a similar hue and value under black light and white light. In this example, a designer or artist may select a particular color from an existing white light only chart, such as Red #280. The reference guide of the present invention may then provide or identify a color sample that correlates with the selected color, such as a color sample that has similar value and hue as Red #280 under both white light and black light. In this manner, an artist coloring an object need only identify which color or colors are desired under white light and utilize the reference guide to select the appropriate matching color to provide the object with a similar look under black light. In yet another example, the reference guide may provide a ratio of mixing a white light paint with a black light paint to achieve the desired value of hue for the paint under both white light and black light.

In yet other another implementation, the color sample may be applied to one or more displays to entertain or attract the attention of one or more viewers. Such displays may be two-dimensional displays, such as posters, paintings, drawings, murals, diagrams and so on. In other implementations, the displays may be three-dimensional figures, such as puppets, sculptures, architectural features and so on. In yet another implementation, the displays including the color sample may be included as part of an amusement park ride or attraction, such as on a ride carriage, within the ride itself, on advertisements or displays about the ride and so on. In still another implementation, the color sample may be applied to an intermediate medium that is applied to an object, such as a thermoplastic urethane film sheet or plastic. In general, the color sample may be applied to any two-dimensional or three-dimensional object in an environment that may include light sources with two different wavelengths.

Figure 1:
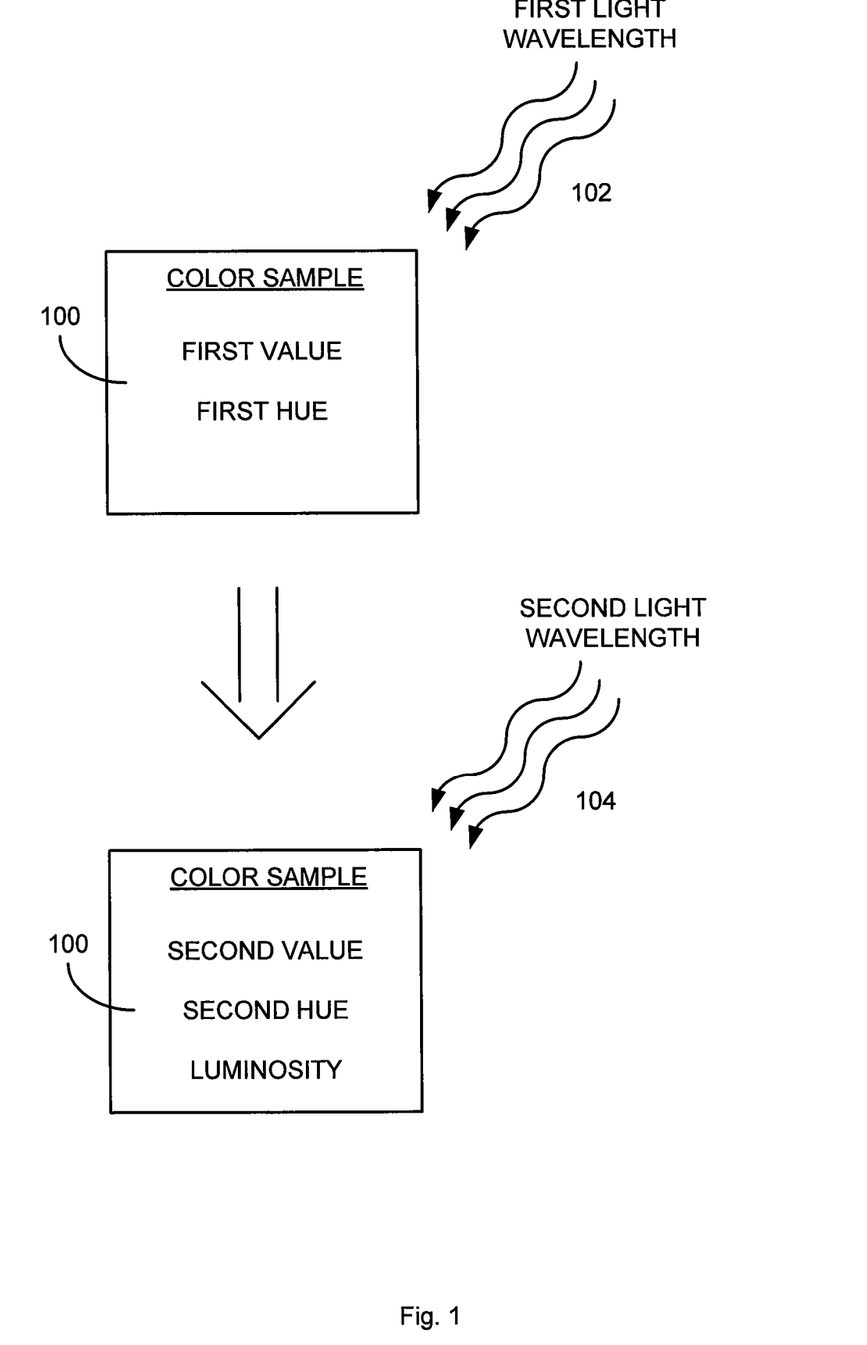
FIG. 1 is a diagram illustrating a color sample that provides a first value and first hue when viewed under a first light and a second value, second hue and luminosity when viewed under a second light.

FIG. 1 is a diagram illustrating a color sample 100 that provides a first value and first hue when viewed under a first light 102 and a second value, second hue and luminosity when viewed under a second light 104. In general, the color sample 100 may be any tangible substance that gives off a color and may be applied to an object, such as paint, ink, colored material such as plastic or cloth, and so on. Further, as used herein, "hue" refers to the color of a sample while "value" refers to the shade and tint of the sample as perceived by a viewer under a particular light wavelength. In general, a color sample may have more than one hue and more than one value, depending the wavelengths of the light that illuminates the color sample.

As shown in FIG. 1, the color sample 100 may have a first hue and a first value when illuminated by a first light wavelength 102. For example, the first hue may be the color blue with a shade and tint that give the color sample a light blue appearance under the first light wavelength 102. Further, the first light wavelength 102 may be white light, or those light wavelengths that fall within the visible light spectrum. Thus, to the naked eye of a viewer under white light, the color sample 100 may have a light blue appearance.

Similarly, the color sample 100 may also have a second hue and second value when illuminated by a second light wavelength 104. In one implementation, the second hue and second value may be similar to the first hue and first value. Thus, continuing the above example, the color sample 100 may appear a similar light blue color under the second light wavelength 104 as it does under the first light wavelength 102. In another implementation, however, the second hue and second value may differ from the first hue and value. For example, the color sample 100 may appear light blue under the first light wavelength 102 and luminous dark red under the second light wavelength 104. Alternatively, the first hue and second hue of the color sample 100 may appear similar while the first value and second value may differ in the first and second light wavelengths. In this example, the color sample 100 may appear as light blue under the first light wavelength 102 but as luminous dark blue under the second light wavelength 104.

In one implementation, the second light wavelength 104 may be those frequencies comprising ultra-violet light, herein referred to as "black light." Thus, the color sample 100 may appear as a first color (including a first hue and first value)

under white light and a second color (including a second hue and second value) under black light. In some implementations, the first hue and value may be similar to the second hue and value such that the color sample 100 appears as the same color or similar under both white light and black light.

In addition to the second value and second hue, the color sample 100 may also include a luminous effect under the second light wavelength 104. In one example, the color sample 100 may include a plurality of UV-sensitive particulates that are included within the sample and are excited by the second light wavelength 104. Once excited, the particulates emit a visible light that provides the color sample 100 with a luminous or glowing effect. In addition, the type of particulate included in the color sample 100 may determine the second hue and second value of the sample under the black light. Thus, some particulates may glow a red color under the black light, while other particulates may glow green under the black light. Thus, the types of particulates utilized to create the luminous effect of the color sample 100 may correlate to the second hue and second value observed under the second light wavelength 104.

In one particular implementation of the color sample 100 of FIG. 1, the first hue and first value appear similar to the second hue and second value under the different light wavelengths. For example, the color sample 100 may appear as the same color to a viewer when illuminated by white light and black light, with the sample appearing to glow under the black light. Thus, the color sample may be used to color a display that may be viewed in environments that include both white light and black light. By utilizing the similarity of the first hue and second hue, the display may appear as the artist intends in either environment with the added luminous effect under the black light.

Figure 2:
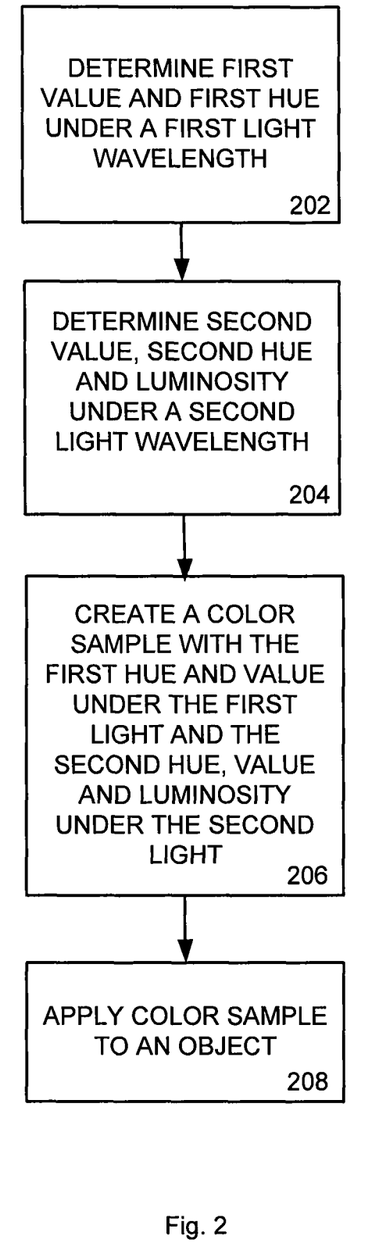
FIG. 2 is a flowchart for creating a color sample that provides a first value and first hue when viewed under a first light and a second value, second hue and luminosity when viewed under a second light.

As may be appreciated, a color sample 100 that appears uniform in a variety of lighting environments may improve the overall appearance and enjoyment of an entertainment setting. For example, the color sample 100 with characteristics under a first and second light source may be applied to posters, paintings, or murals that adorn a home or movie theatre that includes both white light and dark light lighting sources. Similarly, the color sample 100 may be applied to various aspects of amusement park rides and attractions, such as on three-dimensional puppets or models, or on a ride carriage, to enhance the overall appearance of the ride in multiple lighting environments. In general, the color sample 100 may be applied to any two-dimensional or three-dimensional object in an environment that may include a plurality of light sources with different wavelengths. FIG. 2 is a flowchart for creating such a color sample with a first value and first hue when viewed under a first light and a second value, second hue and luminosity when viewed under a second light and applying that color sample to an object for viewing by an observer. The method of FIG. 2 is but one way in which a color sample with particular characteristics under different light wavelengths may be created and applied to an object.

In operation 202, a design artist may select or determine a desired first hue and first value for a first light wavelength in relation to the color sample. Generally, the first light wavelength may be white light. Thus, the artist in operation 202 selects or determines how the color sample appears to an observer under white light. Similarly, in operation 204, the artist may select or determine a desired second hue, second value and possible luminous effect for the color sample under a second light wavelength. As discussed herein, the second light wavelength may be UV light or black light that may excite a plurality of particulates within the color sample such that the sample glows under black light. Thus, in operation 204, the artist may select or determine how the color sample appears to an observer under black light, including the hue, value and luminous effect of the color sample.

In operation 206, a color sample may be created that includes the first hue and first value under the first light wavelength and the second hue and value under the second light wavelength. In one implementation, a white light color sample with the determined characteristics of operation 202 may be mixed or combined with a black light color sample with the determined characteristics of operation 204 into a single color sample. For example, a red-colored paint (as viewed under a white light) may be mixed with a plurality of particulates that glow red when viewed under black light to create a color sample that correlates to the characteristics of the sample determined in operations 202 and 204.

Once created, the color sample may be applied to a two-dimensional or three-dimensional object in operation 208. The application of the color sample to an object may be performed in many ways. For example, the color sample may be painted onto the object, such as a wall or a figure. In another example, the color sample may be printed on the object, such as in the example of a poster, mural, drawing, diagram and so on. In yet another example, the color sample may be printed on a type of plastic sheet and applied to a three dimensional object, such as a ride car or other object. In general, the color sample may be applied to the object in any manner as currently known or hereafter developed to apply a color to a two-dimensional or three-dimensional object.

An additional implementation of the present invention may include the creation and/or utilization of one or more reference guides or tables to simplify the application of a color sample with particular characteristics under a first and second light to an object. Typically, the application of any color sample to an object is a difficult and time-consuming process, especially when the objects to be colored are located remotely around the world. In one particular example, amusement parks may include the same ride or attraction in several parks located around the world. Such rides may include one or more objects that should appear uniform from park to park, even if the parks are located miles apart.

Generally, the creation of an amusement park attraction begins when one or more artists are commissioned to create the look and feel of the attraction. These artists are typically highly skilled and employ methods that are difficult to replicate. The artists may determine the color for several aspects of an amusement park attraction, including ride cars, three-dimensional figures and the appearance of the walls of the attraction. Once the look of the attraction is determined, a description of the attraction is sent, typically through electronic means, to the remotely located parks such that construction of the attractions can begin.

At the remote locations, applicators attempt to mimic the look and feel of the attraction created by the design artist. This may include mixing paint and other color schemes to try and match those created and selected by the design artist. However, such a process is often difficult and potentially requires several iterations of paint mixing and approval by the design artist, often located many miles away from the applicator. Generally, the colorization of an attraction from the description provided by the design artist may require several weeks of trial and error, resulting in a costly and inefficient process. Further, such a process does not often lead to uniformity from park to park, but rather is dependent on the eye of the applicator, which can vary from person to person.

Figure 3:
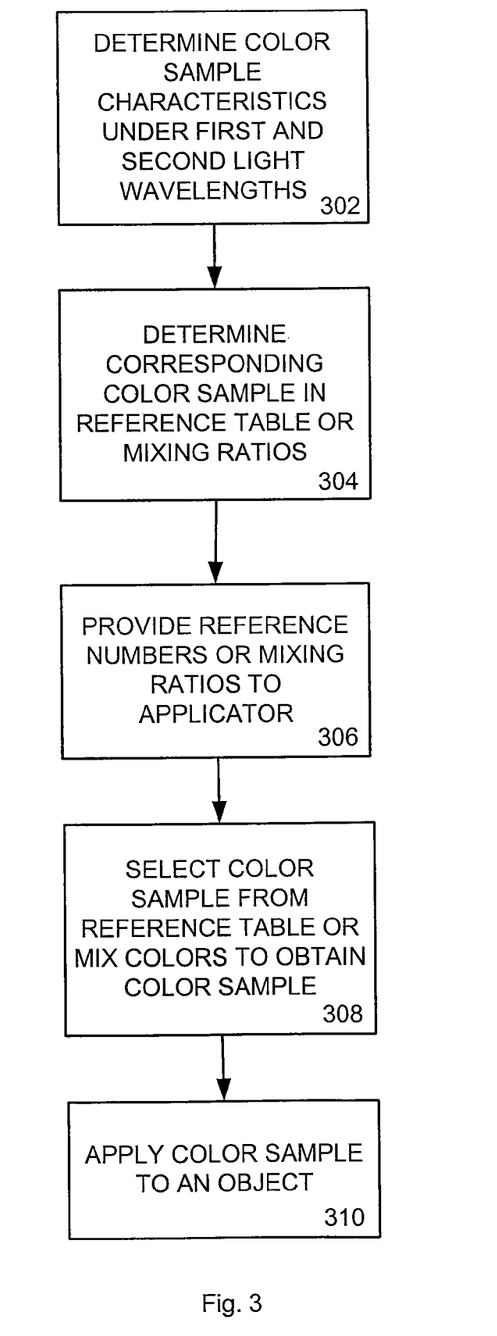
FIG. 3 is a flowchart for utilizing a reference chart or table to apply a color sample that has a first value and first hue when viewed under a first light and a second value, second hue and luminosity when viewed under a second light to a two-dimensional or three-dimensional object.

Thus, to create a perceived uniformity from one application of the color scheme to another, one implementation of the present invention may include a method for creating or utilizing a reference chart or table to apply a color sample that has a first value and first hue when viewed under a first light and a second value, second hue and luminosity when viewed under a second light to a two-dimensional or three-dimensional object. This implementation is shown in FIG. 3 and discussed below. In one example, the reference chart may include mixing ratios for combining two or more color samples to achieve the desired color sample. In another implementation, a reference table may provide an identification of a particular color sample that meets the determined characteristics for the sample, based on either those characteristics or in reference to a corresponding color sample in another reference table.

Beginning in operation 302, a design artist or other artisan may determine the characteristics of a color sample under a first light source and a second light source. These characteristics may include a first hue and value under white light and a second hue, value and luminosity under black light. The determination of such characteristics may be similar to that described above with references to FIGS. 1 and 2. Generally, the design artist may correlate the determined characteristics to a pre-determined color palette or may create a color sample that includes the determined characteristics. For example, the design artist may use a color palette that includes several characteristics of a variety of colors, such as hue and value under a first light wavelength, to select the colors for the object. Further, in some implementations, the color palette may include corresponding hue, value and luminosity for the variety of colors under a second light wavelength. In another example, the artist may select a plurality of colors from the color palette and mix the selected colors to achieve a color sample that matches the desired color characteristics.

In operation 304, the design artist may determine the color sample included in the reference table that corresponds to the color sample characteristics determined in operation 302. In some implementations, the colors in the reference table may correspond to an identifier, such as a reference number that identified the colors of the table. In another implementation, the design artist may note a mixing ratio of a white light color sample and a black light color sample that provides the determined color sample characteristics. In yet other implementations, the combined colors may include one or more of the colors included in the reference table such that the design artist may also note the selected color samples, as well as the mixing ratio to create the combined color sample.

In operation 306, the reference numbers from the reference table and/or mixing ratios may be provided to an applicator located remotely from the design artist. For example, the design artist may provide the applicator with a paint-by-number description of the object such that the applicator may select the proper color samples from the reference table to apply the samples to the object. In this manner, a certain degree of uniformity is achieved as the design artist and the applicator are interacting and selecting colors from the same reference chart. Alternatively, the design artist may provide the applicator with mixing ratios such the applicator may replicate the created color sample remotely using the colors included in the reference chart.

In one particular implementation, the design artist may select a color sample that has particular characteristics under a first light source only in operation 302. For example, the design artist may decide the color samples for an object as the samples appear under white light only with the expectation that the object should also appear as a similar color or colors (but luminous) under black light. Thus, the description of the appearance of the object provided to the applicator in operation 306 may only include reference numbers or identifiers for a reference chart that pertains to white light only. As described below with reference to operation 308, the applicator in this implementation may then use the information identifying the white light only color samples to select a corresponding color sample that includes the determined characteristics under both white light and black light.

In operation 308, the applicator may use the information provided by the design artist to select the proper color sample to apply to an object to achieve a level of uniformity between the designs of the park attractions. For example, the design artist may provide a color sample identifier, such as a reference number, to the applicator that identifies a color sample on a reference table. Thus, the applicator may use the identifier to select the proper color sample to apply to the object in operation 310. In another implementation, the design artist may provide the applicator with a plurality of identifiers that identify color samples from one or more reference tables. In addition, the artist may include a mixing ratio describing the ratio that the plurality of identified colors should be mixed to create the proper color sample to apply to the object. Generally, the applicator may use any information provided by the design artist to select one or more colors from a reference table or chart in operation 308. Further, the selected color samples may be applied to an object, either two-dimensional or three-dimensional, in operation 310 as directed by the design artist.

In the implementation where the design artist provides color sample identifiers based on characteristics of the color samples under white light only, the reference table or chart utilized by the applicator may include one or more color samples correlating to the white light only color samples. For example, the design artist may intend for a particular region of an object to be colored red, the color identified by the identifier Red #120. This information, a definition or description of the region of the object and the color identifier of Red #120, may be provided to the applicator. However, the artist may also indicate that the object is to appear similar under both white light and black light. In this example, the applicator may utilize a reference table or chart that includes a translation from white light only reference identifiers to a plurality of corresponding white light/black light colors. Thus, reference table consulted by the applicator in this case may include a correlation of Red #120 to another color sample that appears similar to Red #120 (but luminous) under both black light and white light. Once the proper color sample is determined through the reference table, the applicator may apply the white light/black light color sample to the object. In this manner, the object may appear as a similar hue and value under both white light and black light, while also being luminous under the black light. Further, such an effect can be achieved without the need for the applicator to continually experiment and mix new paints. Rather, the design artist can provide basic identifying information to the applicator and the dual light frequency effect of the painted object can be achieved.

In some implementations, one or more operations of the flowchart of FIG. 3 may be performed by one or more computing devices. For example, in operation 304, the design artist may upload or transfer the information necessary to replicate the artist's design into a computing device, wherein such information may be stored by one or more computer-readable mediums. In one implementation, such information may include reference numbers to one or more color palette charts. In another implementation, the design artist may simply upload and store a digital image, such as a poster or drawing that the artist intends to replicate in other locations. Once the design information is stored, the computing device may provide the information to an applicator for application to an object in operation 306. In one example, the information may be transferred over a network to the applicator, who can then access the information digitally and use the information to replicate the artist's design.

Further, in operation 308, the computing device may access one or more translation files or charts to select the proper paint or ink to apply to an object. As discussed above, the selection of the proper color sample or samples may depend on the information provided by the design artist. In one implementation, the design artist may provide a color identifier that corresponds to certain characteristics of the color sample under white light. In this situation, a computing device may use this information to select a corresponding color sample that includes such characteristics under both white light and black light, or any other light wavelength. In one particular example, the color design information may be provided to a printer device in communication with the computing device. The printer may receive the color design information and utilize a conversion table to select color samples that include the desired characteristics for the object. For example, the printer may receive an color indicator for Red #250 and may utilize a conversion table to select a corresponding color that is similar to Red #250 under both white light and black light. Similarly, the printer device may use mixing ratios to combine one or more color samples to create a single color sample with the desired characteristics.

Figure 4:
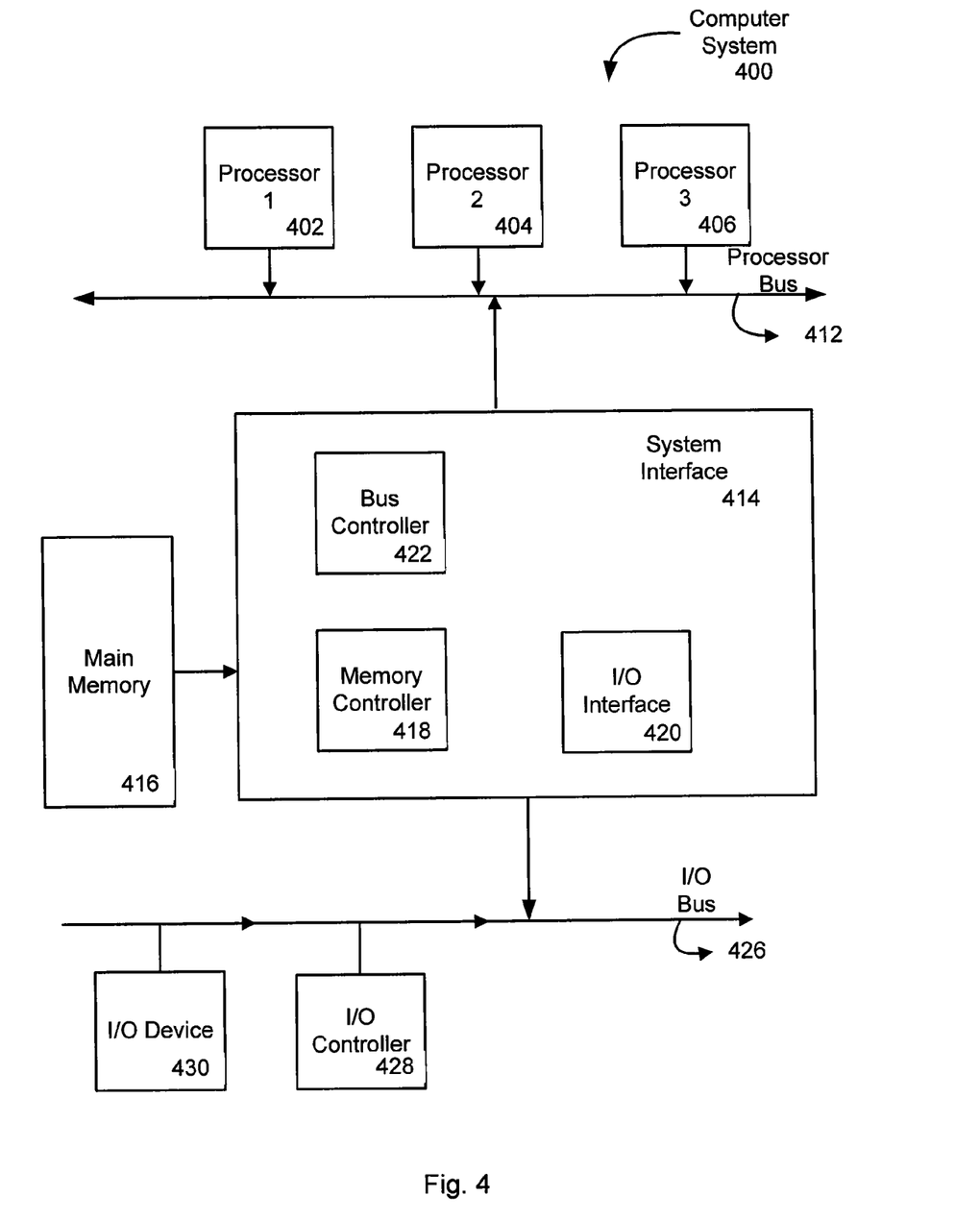
FIG. 4 is a block diagram illustrating one example of a computing device which may be utilized in implementing embodiments of the present invention.

Once the computing device has selected the proper color samples in operation 308, the computing device or a device in communication with the computing device may apply the selected color samples to the object in operation 310. Continuing the example above, the printer may use the selected color samples determined in operation 308 to apply the proper ink to a poster or mural. In one implementation, the printer may combine the first color sample and the second color sample prior to application to the poster or mural (or other two or three-dimensional object). In other implementations, the printer may apply the first color sample to a first region of the two-dimensional object and the second color sample to a second region of the object. For example, the printer may alternate applying dots of the first color sample and second color sample on the poster or mural such that, to the eye of an observer, the two colors appear as one color. However, when viewed under the two light sources, the colored region of the poster may take on a first set of characteristics under the first light source and a second set of characteristics under the second light source. In addition, the colored region may include a luminous effect when viewed under the second light source. Thus, in this manner, one or more computing devices may be utilized to perform the operations of the flowchart of FIG. 3. FIG. 4 is a block diagram illustrating one example of a computing device which may be utilized to perform one or more of the operations of FIG. 3.

FIG. 4 is a block diagram illustrating an example of a computer system 400 which may be used in implementing embodiments of the present invention. The computer system (system) includes one or more processors 402-406 that may include one or more internal levels of cache (not shown) and a bus controller or bus interface unit to direct interaction with the processor bus 412. Processor bus 412 may be used to couple the processors 402-406 with the system interface 414. System interface 414 may be connected to the processor bus 412 to interface other components of the system 400 with the processor bus 412, such as a main memory 416. System interface 414 may also include an input/output (I/O) interface 420 to interface one or more I/O devices with the processor bus 412. One or more I/O controllers and/or I/O devices may be connected with the I/O bus 426, such as I/O controller 428 and I/O device 430, as illustrated.

System 400 may include a dynamic storage device, referred to as main memory 416, or a random access memory (RAM) or other devices coupled to the processor bus 412 for storing information and instructions to be executed by the processors 402-406. System 400 may include a read only memory (ROM) and/or other static storage device coupled to the processor bus 412 for storing static information and instructions for the processors 402-406. According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. The system set forth in FIG. 4 is but one possible example of a computer system that may employ or be configured in accordance with aspects of the present disclosure.

Figure 5:
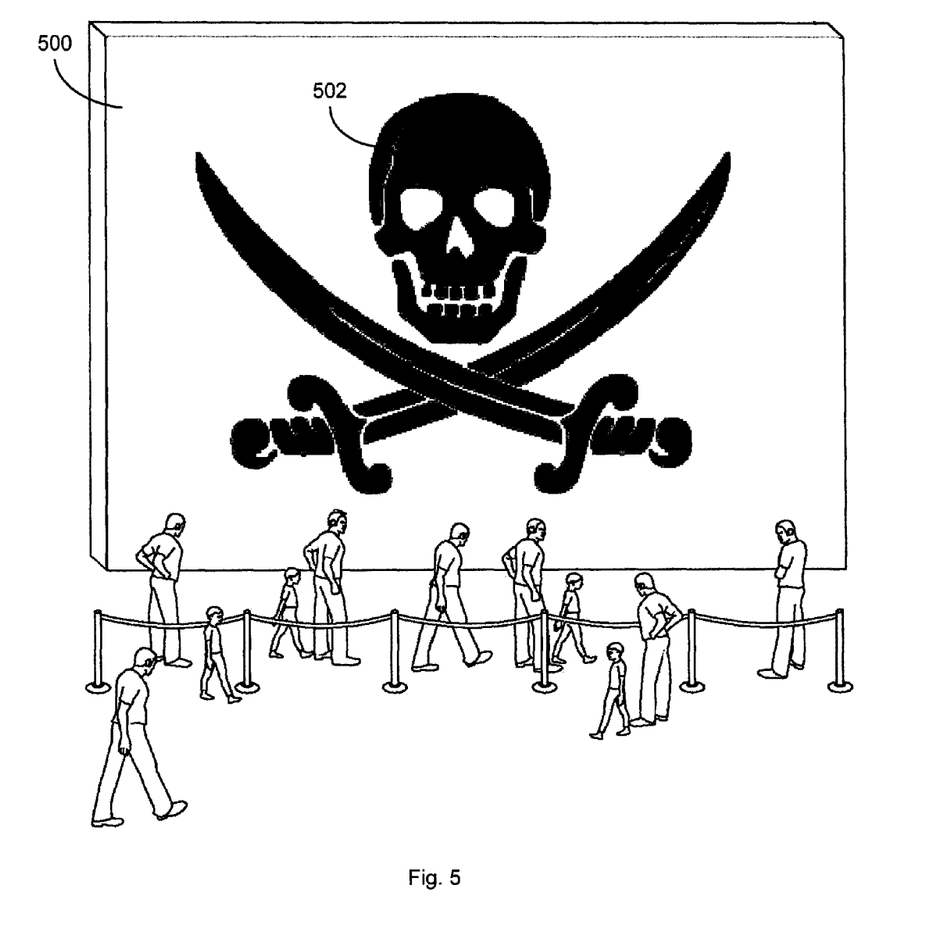
FIG. 5 is a diagram illustrating a mural of a amusement park attraction that utilizes a color sample that has a first value and first hue when viewed under a first light and a second value, second hue and luminosity when viewed under a second light.

Color samples that include a first hue and value under a first light wavelength and a second hue and value and luminosity under a second light wavelength may be applied to any object to enhance the appearance of the object. Such objects may be particularly useful in an entertainment setting, such as an amusement park. FIG. 5 is a diagram illustrating a mural of a amusement park attraction that utilizes a color sample that has a first value and first hue when viewed under a first light and a second value, second hue and luminosity when viewed under a second light. The example shown in FIG. 5 is one example of the color samples described herein being used in a two-dimensional setting.

In this example, the mural 500 may be located at the beginning of an amusement park ride or attraction and oriented to entertain or attract patrons of the park when they are near the ride. Further, the mural 500 may be located in a particular area of the ride or attraction where one or more light sources with different wavelengths may illuminate the mural 500. For example, the mural 500 may include a skull and swords drawing 502, similar to that shown in FIG. 5. The drawing 502 may relate to a theme of the ride or attraction, such as a pirate-based ride. Further, the ride may include both white light and black light to enhance the enjoyment of the ride for the ride patrons. However, some sections of the ride may include an overlap between white light areas and black light areas. In such locations, the mural 500 may utilize the color samples described herein such that the drawing 502 may appear the same hue and value under either light source. In addition, the drawing 502 may appear to glow under the black light source. In this manner, the dual wavelength color samples may be applied to a two-dimensional object such that the appearance of the object appears the same or nearly the same under the differing light sources.

Figure 6:
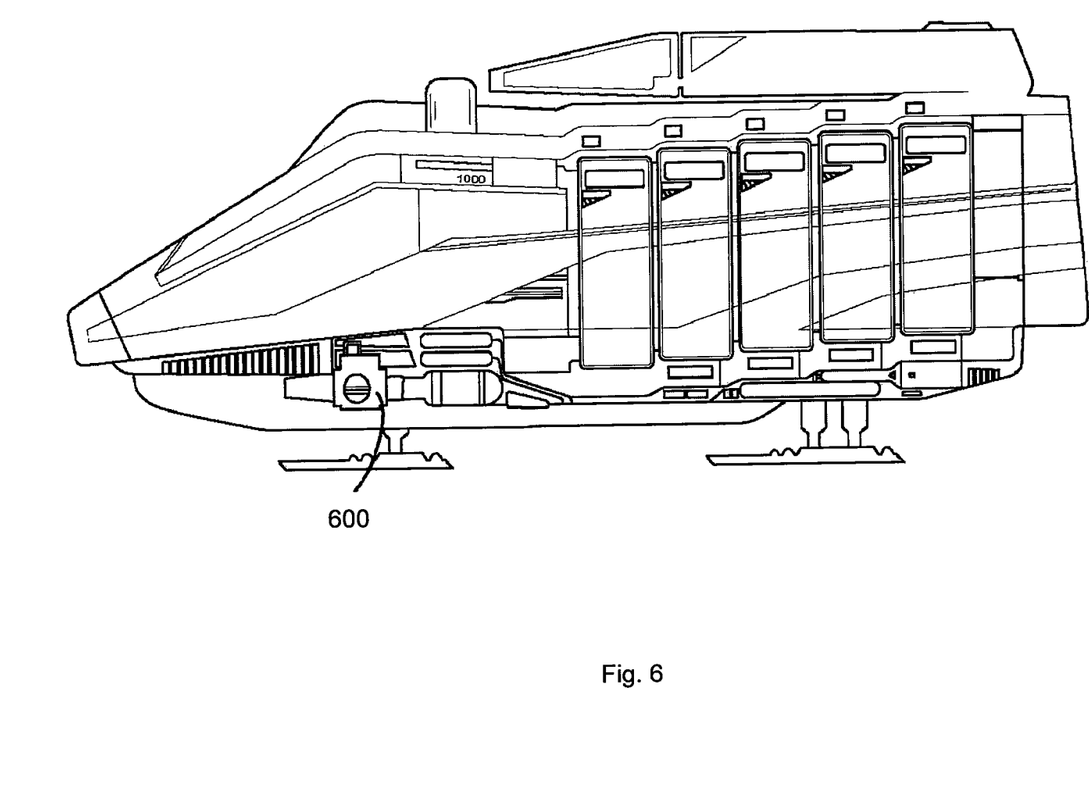
FIG. 6 is a diagram illustrating an amusement park ride vehicle that includes features utilizing color sample that has a first value and first hue when viewed under a first light and a second value, second hue and luminosity when viewed under a second light.

FIG. 6 is a diagram illustrating an amusement park ride vehicle that includes features utilizing color sample that has a first value and first hue when viewed under a first light and a second value, second hue and luminosity when viewed under a second light. The object of FIG. 6 is but one example of a three-dimensional object that may include one or more color samples that have dual wavelength characteristics.

In the example shown, the color samples may be utilized to color a ride car 600 of an amusement park ride. In particular, the ride may include both white light and black light to enhance the enjoyment of the ride for the ride patrons. However, as the ride car 600 travels through the white light and black light environments, the color samples on the outside of the ride car may appear to shift under the different lights. Thus, by utilizing color samples that include a first hue and value under a first light and a second hue and value under a second light, the color of the ride car 600 may appear uniform as the ride car moves through the ride.

The application of the dual wavelength color samples may occur in several ways. For example, the color samples may simply be painted onto the ride car 600. In another example, one or more sheets of thermoplastic urethane film may be printed with ink that has the determined characteristics under the two light sources. These sheets may then be glued or otherwise adhered onto the sides of the ride car 600. Generally, the color samples with the determined characteristics under the two light sources may be applied in any manner known or hereinafter developed.

As should be appreciated, the color samples described herein may have multiple applications beyond that of amusement parks. For example, a poster or painting that hangs in someone's home may utilize the color samples with differing characteristics under two separate light sources. In another example, information provided through the dash of a car may also include the color samples such that the colored regions may appear to glow under black light but maintain the general appearance of the desired color under white light. Generally, the color samples may apply to any object that may encounter environments that include two light sources with differing wavelengths. The examples used herein are but a few possible implementations of present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of creating a known reference between a first color sample under a first light source having a first wave length, and a second color sample under a second light source having a second wave length, comprising:
   providing a first color sample including a perceived value and hue under the first light source;
   providing a second color sample including a perceived value, hue and luminosity under the second light source; and
   combining the first color sample and the second color sample to create a combined color sample; wherein
   the value and hue of the first color sample under the first light source translates into a known value and hue of the second color sample under the second light source; wherein
   the first light source is white light, the second light source is black light, and the combined color sample has a perceived value and hue that is substantially the same under the first and second light sources.

2. The method of claim 1, wherein said first color sample creates color by reflection of the light from the first light source, and said second color sample creates color by illumination by excitation by the second light source.

3. The method of claim 1, further comprising:
   instructing use of the combined color sample on at least one region of an object so that the at least one region has a perceived value and hue under the first light that matches the first color sample and a perceived value and hue under the second light that matches the second color sample.

4. The method of claim 1, wherein combining the first color sample and the second color sample to create the combined color sample comprises one of:
   overlaying the first color sample over at least a portion of the second color sample; or
   mixing the first color sample and the second color sample together.

5. A method of creating a known reference between white light colors and black light colors comprising:
   providing a first reference including at least one color, the color providing a perceived value and hue under a white light source;
   a second reference including at least one color, the color providing a perceived value, hue and luminosity under a black light source; and
   creating a combined color sample using the first reference and the second reference; wherein
   the value and hue of the first reference under the white light source translates into a known value and hue of the second reference under the black light source; wherein
   the combined color sample has a perceived value and hue that is substantially the same under the white light source and the black light source.

6. A method as defined in claim 5, further comprising:
   instructing use of the at least one color on at least one region of an object.

7. A method as defined in claim 6, wherein:
   instructing includes dictating a specific first reference to be used on a particular portion of an object.

8. A method as defined in claim 6, wherein:
   instructing includes sensing a color of a sample object and dictating a specific first reference to be used on a corresponding portion of a replica object.

9. A method as defined in claim 8, wherein:
   the sample object is a digital image, and the act of dictating is performed by a software module to instruct a means for creating a tangible replica object.

10. A method as defined in claim 9, wherein said means for creating is a printer.

11. A method as defined in claim 6, wherein:
    the object is one of a two-dimensional object or a three-dimensional object.

12. A method as defined in claim 6, wherein:
    instructing includes dictating manual application of the color sample on the at least one region of the object.

13. A method as defined in claim 6, wherein:
    instructing includes dictating application of the color sample on at least one translucent or transparent sheet.

14. A method as defined in claim 13, wherein:
    instructing includes dictating application of the at least translucent or transparent sheet to the at least one region of the object.

15. A method of printing a colored object:
    determining a first color sample including a perceived value and hue under a first light source having a first wave length;
    utilizing a reference to translate the first color sample into a second color sample, the second color sample including a perceived value, hue and luminosity under a second light source having a second wave length, wherein the value and hue of the first color sample is substantially similar to the value and hue of the second color sample; and printing the first color sample and the second color sample onto a two-dimensional object so as to combine the first color sample and the second color sample into a combined color sample; wherein the first light source is white light, the second light source is black light, and the combined color sample has a perceived value and hue that is substantially the same under the first and second light sources.

16. The method of claim 15 wherein the printing operation comprises:

applying the combined color sample to at least a first region of the two-dimensional object.

17. The method of claim 15 wherein the reference is a reference table providing a known translation from the first color sample to the second color sample.

* * * * *